(12) United States Patent
Oishi et al.

(10) Patent No.: US 8,045,949 B2
(45) Date of Patent: Oct. 25, 2011

(54) NOISE CANCELLATION CIRCUIT AND AMPLIFIER WITH NOISE CANCELLATION CIRCUIT

(75) Inventors: Kazuaki Oishi, Kawasaki (JP); Shingo Sakamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 12/471,934

(22) Filed: May 26, 2009

(65) Prior Publication Data

US 2009/0291661 A1    Nov. 26, 2009

(30) Foreign Application Priority Data

May 26, 2008 (JP) ................................. 2008-136967

(51) Int. Cl.
*H04B 1/10* (2006.01)
(52) U.S. Cl. ..................... 455/311; 455/63.1; 455/67.13; 375/346
(58) Field of Classification Search ................. 455/63.1, 455/67.13, 296, 311; 375/346
See application file for complete search history.

(56) References Cited

U.S. PATENT DOCUMENTS

| 2004/0150457 A1 | 8/2004 | Miyagi |
| 2007/0010228 A1 | 1/2007 | Schelmbauer et al. |
| 2007/0177693 A1* | 8/2007 | Kluge ........................... 375/332 |
| 2009/0088124 A1* | 4/2009 | Schuur et al. ................. 455/341 |

FOREIGN PATENT DOCUMENTS

| JP | 2007-6493 A | 1/2007 |
| WO | WO 03/003561 A1 | 1/2003 |

* cited by examiner

*Primary Examiner* — Raymond Dean
(74) *Attorney, Agent, or Firm* — Arent Fox LLP

(57) ABSTRACT

A noise cancellation circuit, which reduces noise in an output signal of an amplifier having an input resistance, a feedback resistance, and an operational amplifier, has: a first mixer circuit, which input an input signal across a first input terminal and a second input terminal of the operational amplifier, and performs frequency conversion of the input signal according to a first frequency signal; a noise cancellation amplifier, which amplifies an output signal of the first mixer circuit; a second mixer circuit, which performs frequency conversion of an output signal of the noise cancellation amplifier according to the first frequency signal; and a signal supply circuit, which supplies an output signal of the second mixer circuit to the first input terminal of the operational amplifier via an output resistance.

14 Claims, 12 Drawing Sheets

NOISE CANCELLATION CIRCUIT AND AMPLIFIER WITH NOISE CANCELLATION CIRCUIT

CROSS-REFERENCE TO RELATED APPLICATIONS

This application is based upon and claims the benefit of priority from the prior Japanese Patent Application No. 2008-136967, filed on May 26, 2008 the entire contents of which are incorporated herein by reference.

FIELD

This invention relates to a noise cancellation circuit and to an amplifier with a noise cancellation circuit.

BACKGROUND

A mixer (frequency mixer) has a frequency conversion function, and is an important constituent element in circuits for wireless communication. For example, high-frequency signals received by an antenna are converted into low-frequency signals by a mixer circuit. In the case of a direct-conversion receiver, for example, a mixer circuit performs frequency conversion of high-frequency signals to the baseband level. A mixer circuit multiplies input high-frequency signals by local frequency signals, and outputs the down-converted low-frequency signals and up-converted high-frequency signals. And, either the low-frequency signals or the high-frequency signals are used in a later-stage circuit.

In electronic communication fields in recent years, demands for reduced power consumption, smaller device sizes, and lower prices have led to the realization of such mixer circuits as circuits comprising MOS transistors.

A mixer circuit comprising MOS transistors has the problem that output signals are combined with 1/f noise (flicker noise). The lower the frequency, the higher is the level of this 1/f noise, so that a down-converted low-frequency signal has a lower (worse) S/N ratio at lower frequencies, causing degradation of the reception sensitivity of the receiver.

1/f noise is inversely proportional to the ½-power of the gate area of a MOS transistor ($1/f\ noise \propto 1/\sqrt{(gate\ area)}$). That is, the larger the gate area of a MOS transistor, the weaker the 1/f noise tends to be. However, if the gate area is made too large, the chip area increases, and the increased gate capacitance causes a reduction in operation speed and increased current consumption. Hence there is the problem that if transistor sizes are reduced, 1/f noise occurs.

As one method of suppressing 1/f noise, the current of the current source on the input side of a mixer circuit may be detected, and feedback control is executed so that the detected current equals a target value, to reduce 1/f noise. Another method is to use P-channel MOS transistors as the MOS transistors comprised by high-frequency circuits and mixer circuits to reduce 1/f noise.

The Japanese Laid-Open Patent 2007-6493 and the International Laid-Open Patent WO2003/003561 disclose a frequency mixer circuit.

The method in which the current of the current source on the input side of the mixer circuit is detected, and feedback is used such that the detected current equals a target value, is applied to specific input circuits of mixer circuits, but entails a complex circuit configuration and is not preferred.

The method in which the circuit is configured using P-channel MOS transistors requires modifications, including modifications to semiconductor device processes, and so is not preferred.

SUMMARY

Hence an object of this invention is to provide a noise cancellation circuit, and an amplifier with a noise cancellation circuit, which reduces or eliminates 1/f noise.

A noise cancellation circuit, which reduces noise in an output signal of an amplifier having an input resistance, a feedback resistance, and an operational amplifier, has: a first mixer circuit, which input an input signal across a first input terminal and a second input terminal of the operational amplifier, and performs frequency conversion of the input signal according to a first frequency signal; a noise cancellation amplifier, which amplifies an output signal of the first mixer circuit; a second mixer circuit, which performs frequency conversion of an output signal of the noise cancellation amplifier according to the first frequency signal; and a signal supply circuit, which supplies an output signal of the second mixer circuit to the first input terminal of the operational amplifier via an output resistance.

The low-frequency 1/f noise in the output signal of an amplifier or mixer unit may be reduced or eliminated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
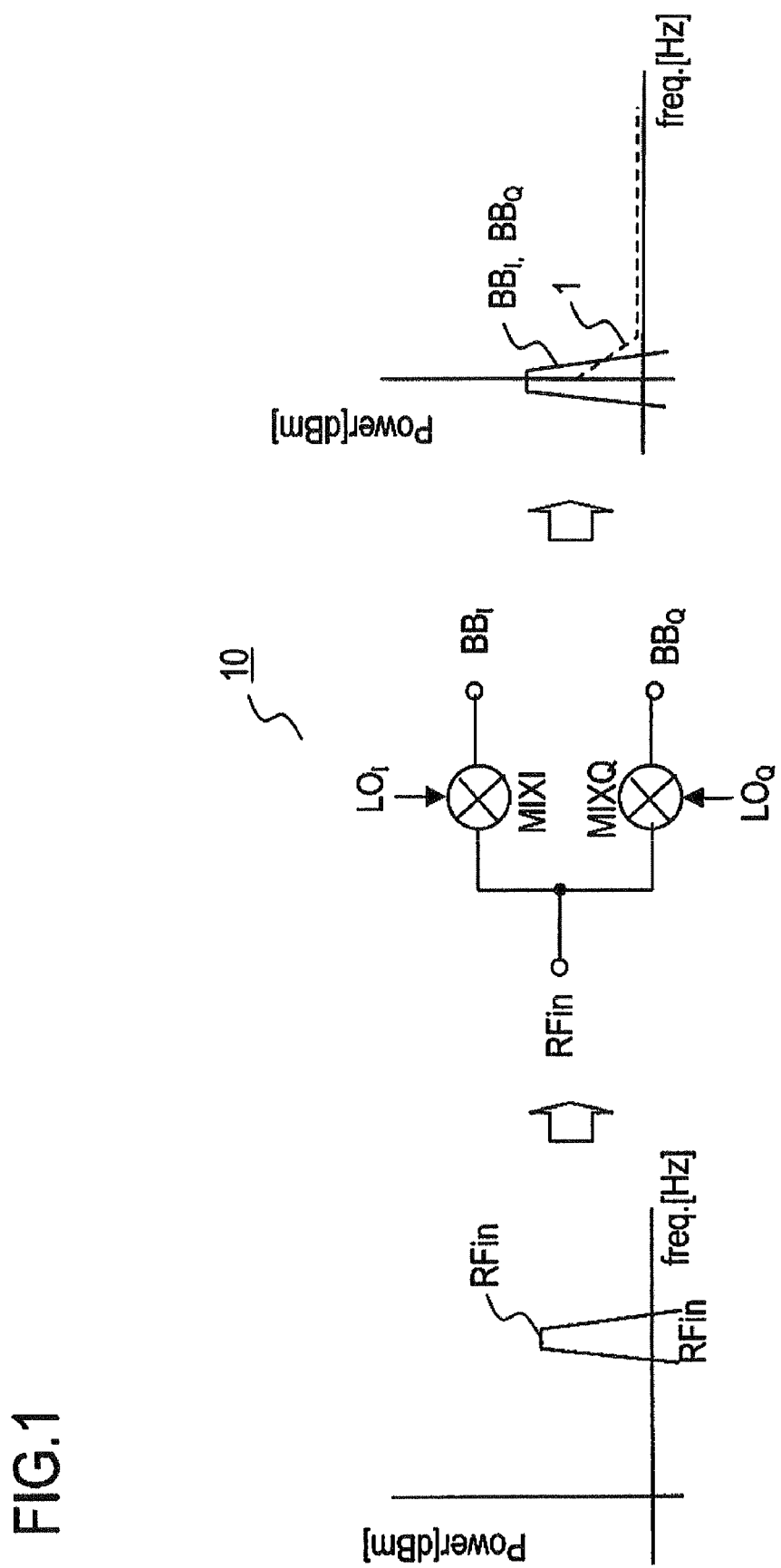
FIG. 1 shows a wireless communication circuit.

FIG. 1 shows a wireless communication circuit. The reception circuit 10 of the wireless communication circuit has mixers MIXI, MIXQ which perform low-frequency conversion of received high-frequency signals RFin to local frequency signals LOI, LOQ. In this example of a reception circuit 10, the local frequency signals LOI and LOQ have orthogonal phases each other, and the outputs BBI and BBQ of the mixers MIXI and MIXQ are the real component and the imaginary component. The mixers MIXI and MIXQ are multipliers, and the outputs thereof BBI and BBQ have frequencies which are the difference of the frequency of the received high-frequency signals RFin and the frequencies of the local frequency signals LOI and LOQ. When the frequencies are equal, the outputs BBI and BBQ have DC components in the baseband frequency band.

On the left in FIG. 1 is shown a received high-frequency signal RFin and on the right is shown a noise component 1. The horizontal axis corresponds to the frequency freq, and the vertical axis to the power. If the mixers MIXI and MIXQ are circuits comprising MOS transistors, then 1/f noise arising from the MOS transistors appears in the output signal. That is, the noise component 1 is noise arising from thermal noise in the high-frequency band, whereas in the low-frequency band, 1/f noise caused by the MOS transistors dominates. In particular, the lower the frequency, the more intense is the 1/f noise.

The received high-frequency signal RFin is a signal in a high frequency band, so that even if 1/f noise exists, the S/N ratio is high and is not readily affected by the 1/f noise. However, upon frequency-conversion by the mixers MIXI and MIXQ, the frequency of the received signal RFin is converted to a low frequency band, and as shown by the graph on the right in FIG. 1, low-frequency 1/f noise is included in the mixer outputs BBI and BBQ, so that the S/N ratio of the received signal RFin declines and reception sensitivity tends to be degraded.

Figure 2:
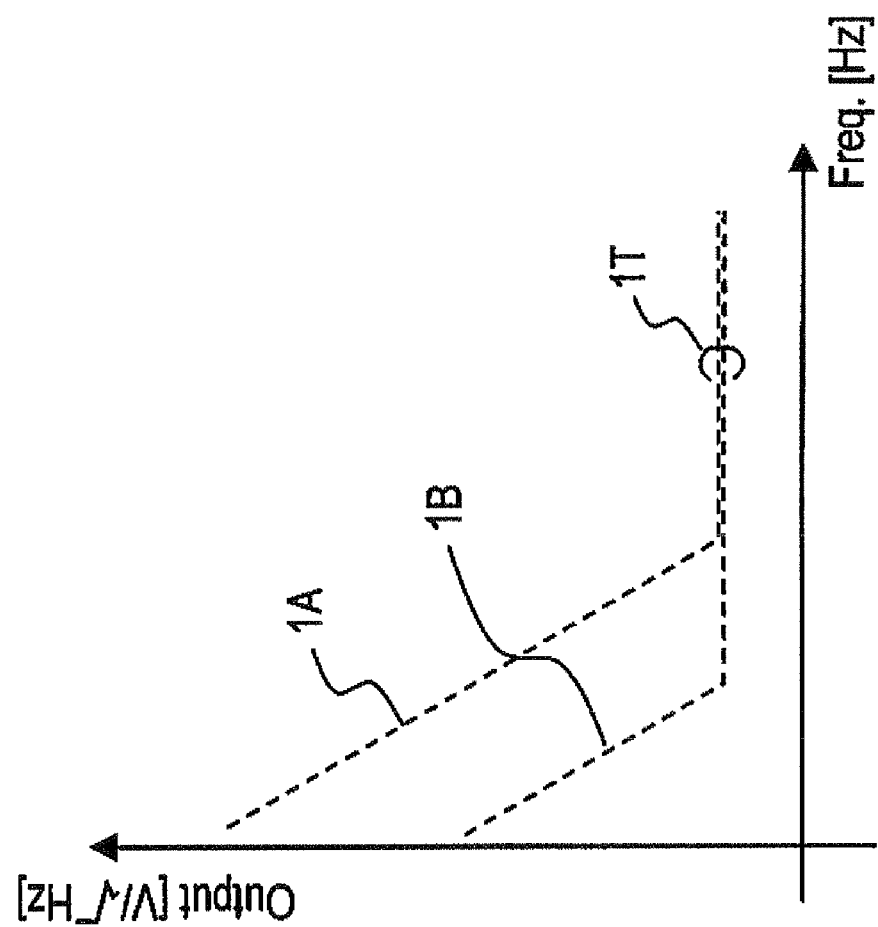
FIG. 2 shows the relation between MOS transistor gate area and noise.

FIG. 2 shows the relation between MOS transistor gate area and noise. The horizontal axis corresponds to the frequency freq, and the vertical axis corresponds to the power. As explained above, 1/f noise 1A and 1B is inversely proportional to the ½-power of the gate area of the MOS transistor. Hence when the MOS transistor gate area is large the 1/f noise 1B is weak, and when the gate area is small the 1/f noise 1A is strong. The noise 1T in the high-frequency band is a noise component arising mainly from thermal noise.

Hence the larger the MOS transistor gate area, the more the 1/f noise of a circuit comprising such MOS transistors can be reduced. However, if the gate area is made large, the integration level is reduced, the chip area is increased, transistor switching speeds are lowered, and power consumption increases. Thus reduction of MOS transistor gate areas to the extent possible is desirable in order to reduce device sizes, lower power consumption and achieve faster operation, and so there is a need to reduce or eliminate the accompanying 1/f noise.

Figure 3:
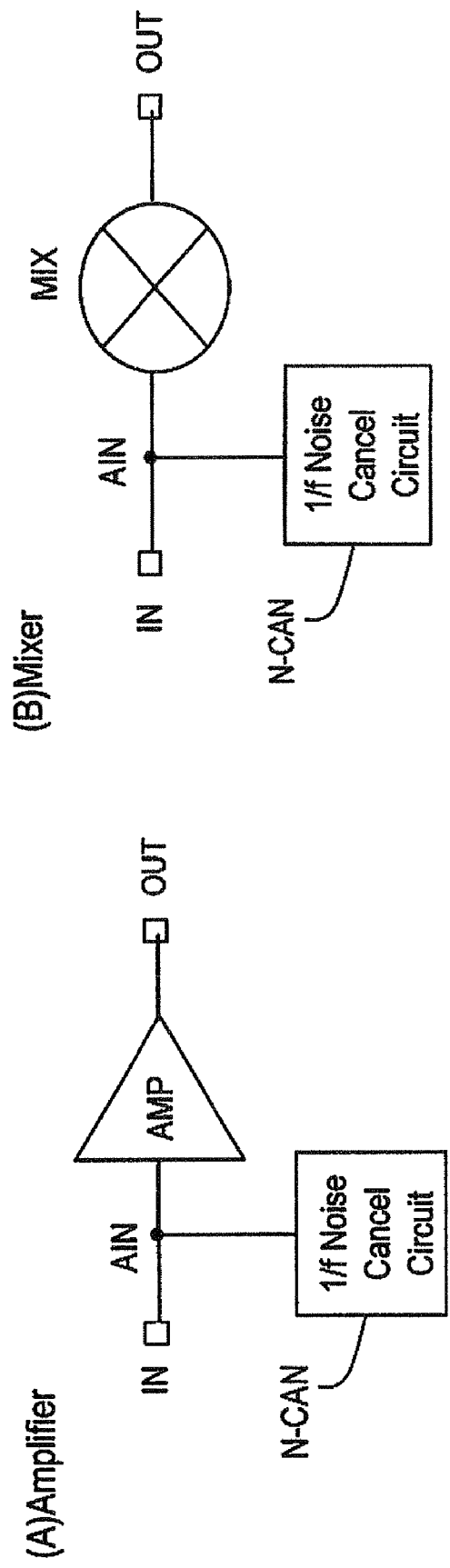
FIG. 3 shows in summary the configuration of an embodiment.

FIG. 3 shows in summary the configuration of an embodiment. FIG. 3A is an example of an amplifier circuit AMP; a noise cancellation circuit N-CAN is provided at the input terminal AIN, 1/f noise existing at the input terminal AIN is detected and a noise cancellation signal is supplied, and the 1/f noise at the output terminal OUT of the amplifier circuit is reduced or eliminated. FIG. 3B is an example of a mixer MIX; this mixer MIX comprises an amplifier circuit, not shown. The comprised amplifier circuit outputs an output signal to the output terminal OUT of the mixer. In the case of the mixer also, a noise cancellation circuit N-CAN is provided at the input terminal AIN of the comprised amplifier circuit.

According to this principle, the noise cancellation circuit N-CAN detects the noise component at the input terminal AIN, generates a noise cancellation signal which reduces, eliminates, or cancels the noise appearing at the output terminal OUT arising from this noise component, and supplies the signal to the input terminal AIN. The noise cancellation circuit N-CAN comprises an amplifier which generates a noise cancellation signal; this operational amplifier also generates 1/f noise. In order to eliminate this 1/f noise, the noise cancellation circuit N-CAN frequency-converts the frequency of the noise signal of the input terminal AIN according to a local frequency signal, amplifies the resulting signal using the amplifier, and again frequency-converts the output frequency according to a local frequency signal. By this means, the frequency of 1/f noise comprised by the output signal of the comprised amplifier is converted from a low frequency band to a high frequency band, and DC-component 1/f noise is eliminated from the noise cancellation signal supplied to the input terminal AIN.

Figure 4:
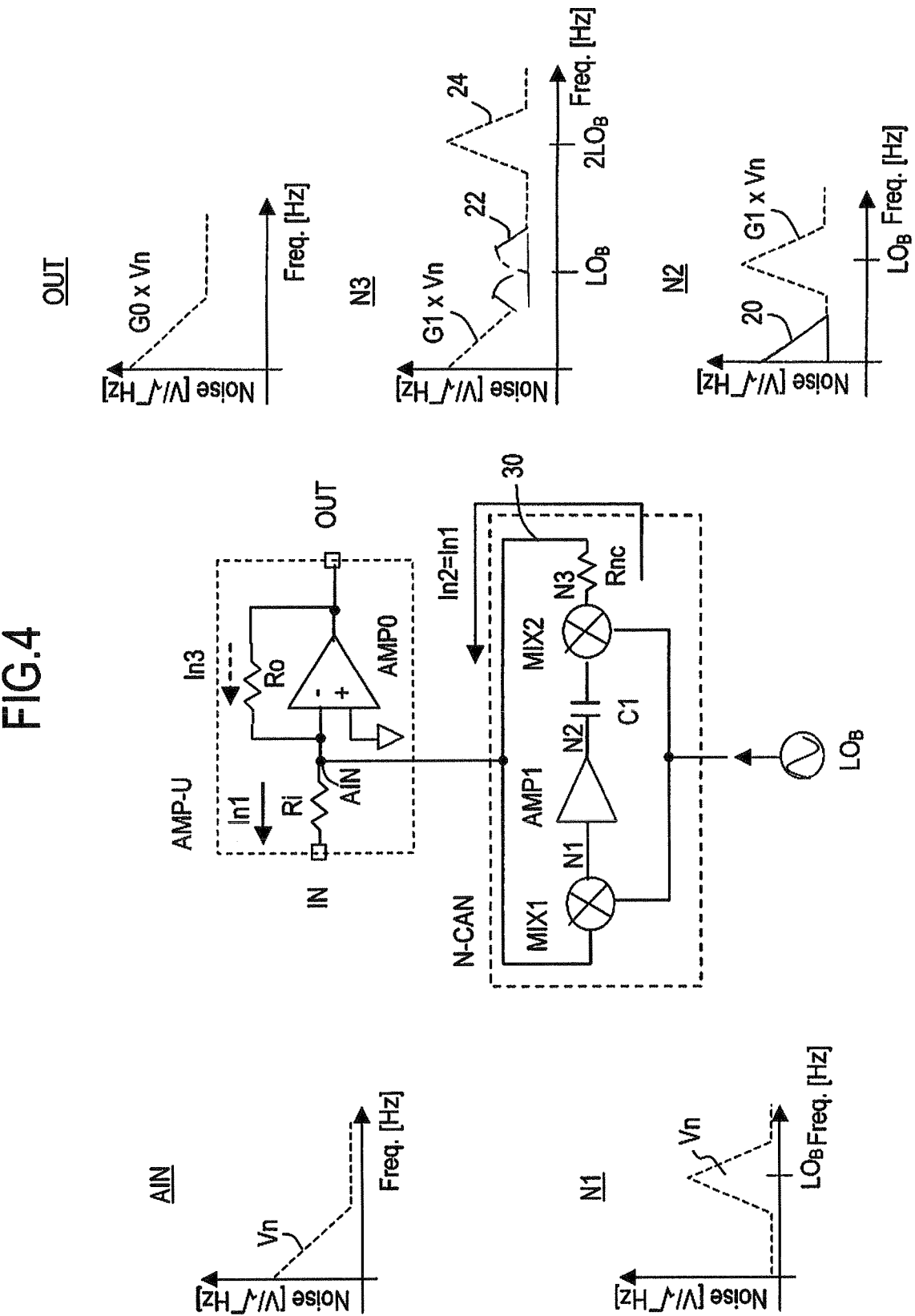
FIG. 4 shows the configuration of the amplifier and noise cancellation circuit in this embodiment.

FIG. 4 shows the configuration of the amplifier and noise cancellation circuit in this embodiment. The amplifier AMP-U has an operational amplifier AMP0, an input resistance Ri, and a feedback resistance (output resistance) Ro. The input terminal IN of the amplifier AMP-U is connected via the input resistance Ri to the first input terminal (−) of the operational amplifier AMP0; the output of the operational amplifier AMP0 is connected to the output terminal OUT. The example of FIG. 4 is an example of a single-phase signal, and the second input terminal (+) is for example connected to ground or another reference power supply. However, a differential input signal may be input across the first and second input terminals. An example for the case of a differential signal is described below.

The noise cancellation circuit N-CAN has a first mixer MIX1, noise cancellation amplifier AMP1, and second mixer MIX2; a local frequency signal LOB is supplied to the first and second mixers MIX1 and MIX2. A capacitor C1 may be inserted between the output of the noise cancellation amplifier AMP1 and the input of the second mixer MIX2. This capacitor C1 functions as a high-pass filter.

In FIG. 4, the frequency spectra of the signals at each of the nodes AIN, N1, N2, N3, OUT are shown. Operation of the amplifier APM-U and noise cancellation circuit N-CAN is explained referring to these spectra. When the operational amplifier AMP0 of the amplifier AMP-U is a circuit comprising MOS transistors, as explained above, if the gain is G0, then noise Vn with power 1/G0 of the noise (G0×Vn) at the output terminal OUT, is present at the input terminal AIN of the operational amplifier AMP0. This noise Vn at the input terminal AIN is noise in the input signal across the first and second input terminals of the operational amplifier, and the lower the frequency, the more the noise intensity has the 1/f noise characteristic, and is generated from within the operational amplifier AMP0. The gain G0 is the gain of the amplifier AMP-U, and depends on the input resistance Ri and output resistance Ro.

In the noise cancellation circuit N-CAN, the first mixer MIX1 input an input signal across the first and second input terminals of the operational amplifier, and performs frequency conversion according to the local frequency signal LOB. The mixer MIX1 is a multiplier, which multiplies the signal at the input terminal AIN with the local frequency signal LOB to perform frequency conversion. As a result, the 1/f noise Vn at the output terminal N1 of the first mixer MIX1 is frequency-converted (up-converted) near the local frequency LOB.

When the noise cancellation amplifier AMP1 amplifies the signal at the output terminal N1, noise increased by the gain G1 of the amplifier AMP1 (G1×Vn) appears at the output terminal N2 of the amplifier AMP1. However, because the amplifier AMP1 is also a circuit comprising MOS transistors, low-frequency 1/f noise 20 appears at the output terminal N2.

This 1/f noise 20 is similar to the 1/f noise (G0×Vn) generated at the output terminal OUT of the amplifier AMP-U.

The second mixer MIX2 performs frequency conversion of the signal at the output terminal N2 according to the local frequency signal LOB. As a result, in the signal at the output terminal N3 of the mixer MIX2, the noise G1×Vn is down-converted to the low-frequency band, and is also up-converted to near 2LOB, shown as the signal 24. Also, the 1/f noise 20 is up-converted to near the local frequency LOB, as with the signal 22. However, when a capacitor C1 is provided, the high-pass filter function of the capacitor C1 causes the low-frequency component of the 1/f noise 20 to be eliminated, and up-converted to near the local frequency LOB. That is, a portion of the frequency components of the signal 22 are eliminated.

In the noise cancellation circuit N-CAN, the noise cancellation signal supply circuit 30 having an output resistance Rnc supplies the signal of the output terminal N3 of the second mixer MIX2 via the resistance Rnc to the input terminal AIN of the operational amplifier AMP0.

In the above explanation, the gain of the first and second mixers MIX1 and MIX2 is set equal to 1 in order to simplify the explanation. However, the sum of the gains of the two mixers MIX1 and MIX2 and of the amplifier AMP1 may be equal to G1.

The gain G1 and the output resistance Rnc are set such that the current In2, obtained by dividing the voltage difference between the voltage at the output terminal N3 of the second mixer MIX2 (G1×Vn) and the voltage at the input terminal AIN of the operational amplifier by the output resistance Rnc, is equal to or substantially equal to the low-frequency noise current In1 flowing from the input terminal AIN of the operational amplifier to the input resistance Ri. For example, when the output resistance Rnc is equal to the input resistance Ri (Rnc=Ri), the gain may be set to G1=2. That is, the current In1 flowing in the input resistance Ri of the amplifier AMP-U is as follows.

$$In1=Vn/Ri$$

On the other hand, the current In2 supplied from the output N3 of the second mixer MIX2 to the input terminal AIN is as follows.

$$In2=(G1\times Vn-Vn)/Rnc=(2Vn-Vn)/Rnc=Vn/Rnc$$

Here Rnc=Ri, so that In1=In2.

In the amplifier AMP-U, the current In1 flowing in the input resistance Ri flows as the current In3 in the feedback resistance Ro of the operational amplifier AMP0, so that a voltage In3×Ro appears at the output terminal OUT. That is, due to the 1/f noise Vn at the input terminal AIN, the current In1 appearing in the input resistance Ri flows in the feedback resistance Ro, so that noise multiplied by the gain G0 (G0×Vn) is generated at the output terminal OUT.

The noise cancellation circuit N-CAN supplies the noise cancellation current In2, and moreover In2=In1, so that the current In3 does not appear in the feedback resistance Ro. As a result, 1/f noise does not appear at the output terminal OUT of the amplifier AMP-U. That is, 1/f noise is eliminated from the output terminal OUT of the amplifier AMP-U.

The relation between the gain G1 and the output resistance Rnc is such that the higher the output resistance Rnc, the higher is the gain G1, and conversely the lower the output resistance Rnc, the lower is the gain G1, and it is desirable that values be set such that In2=In1. This is because if In2=In1, 1/f noise is completely cancelled at the output terminal OUT of the amplifier AMP-U.

However, the relation between the gain G1 and the output resistance Rnc need not be set as described above, and if some noise cancellation current In2 is supplied to the input terminal AIN, then the current In3 flowing in the output resistance Ro of the amplifier AMP-U is reduced, and so 1/f noise at the output terminal OUT is also reduced.

And, the noise cancellation circuit N-CAN is provided with first and second mixers MIX1 and MIX2 on the input and output sides of the noise cancellation amplifier AMP1. These mixers perform frequency conversion of an input signal by multiplication with the local frequency signal LOB. Hence 1/f noise generated by the noise cancellation amplifier AMP1 becomes a high-frequency component near the local frequency LOB at the output terminal N3, and even when supplied to the input terminal AIN of the operational amplifier AMP0, has no effect on the low-frequency 1/f noise at the input terminal AIN. If the first and second mixers were not provided, even if the output of the noise cancellation amplifier AMP1 would be supplied to the operational amplifier input terminal AIN to cancel the 1/f noise, the 1/f noise existing at the output of the amplifier AMP1 would also be supplied to the input terminal AIN, so that noise would not be effectively cancelled.

The capacitor C1 between the noise cancellation amplifier AMP1 and the second mixer MIX2 has a high-pass filter function, and can transmit high-frequency components even when the DC level of the amplifier AMP1 and the DC level of the mixer MIX2 are different. Hence depending on the configurations of the amplifier AMP1 and mixer MIX2, the capacitor C1 may not be necessary.

The first and second mixers MIX1, 2 in FIG. 4 comprise switching circuits employing MOS transistors, as explained below, and do not have internal operational amplifiers, so that they themselves do not generate 1/f noise.

Figure 5:
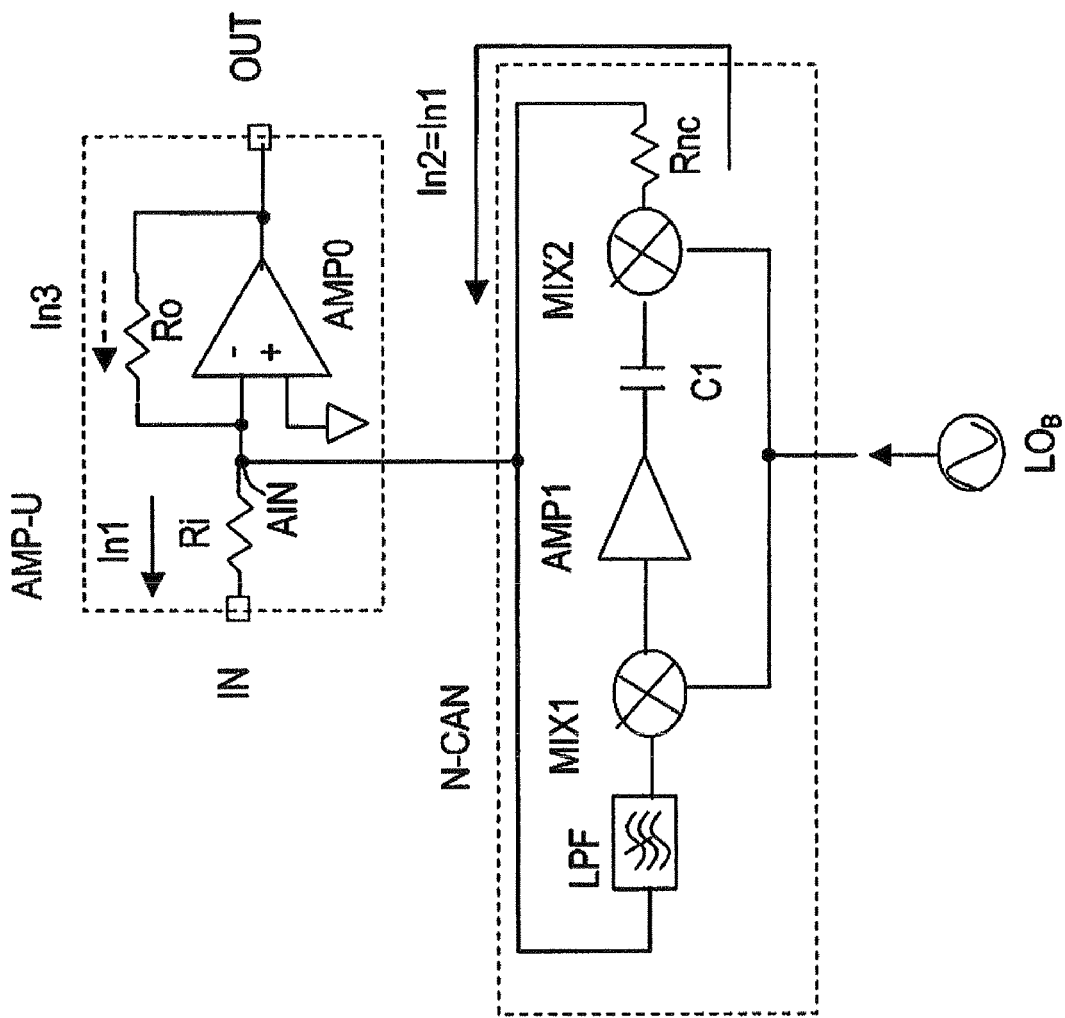
FIG. 5 shows the configuration of the amplifier and noise cancellation circuit in a second embodiment.

FIG. 5 shows the configuration of the amplifier and noise cancellation circuit in a second embodiment. This noise cancellation circuit N-CAN has a low-pass filter LPF on the input side of the first mixer MIX1. Otherwise, the configuration is the same as that of the amplifier and noise cancellation circuit in FIG. 4.

When image frequency signals, such as for example signals at frequency 2LOB which is twice the local frequency LOB, are input across the first and second input terminals of the operational amplifier AMP0, frequency conversion to the local frequency LOB is performed by the two mixers MIX1, 2, and the image frequency signals become baseband components and are included in the noise cancellation signal In2.

In order to avoid this situation, in the embodiment of FIG. 5, a low-pass filter LPF is provided on the input side of the first mixer MIX1. This low-pass filter LPF removes the image frequency signals input to the input terminal AIN.

Figure 6:
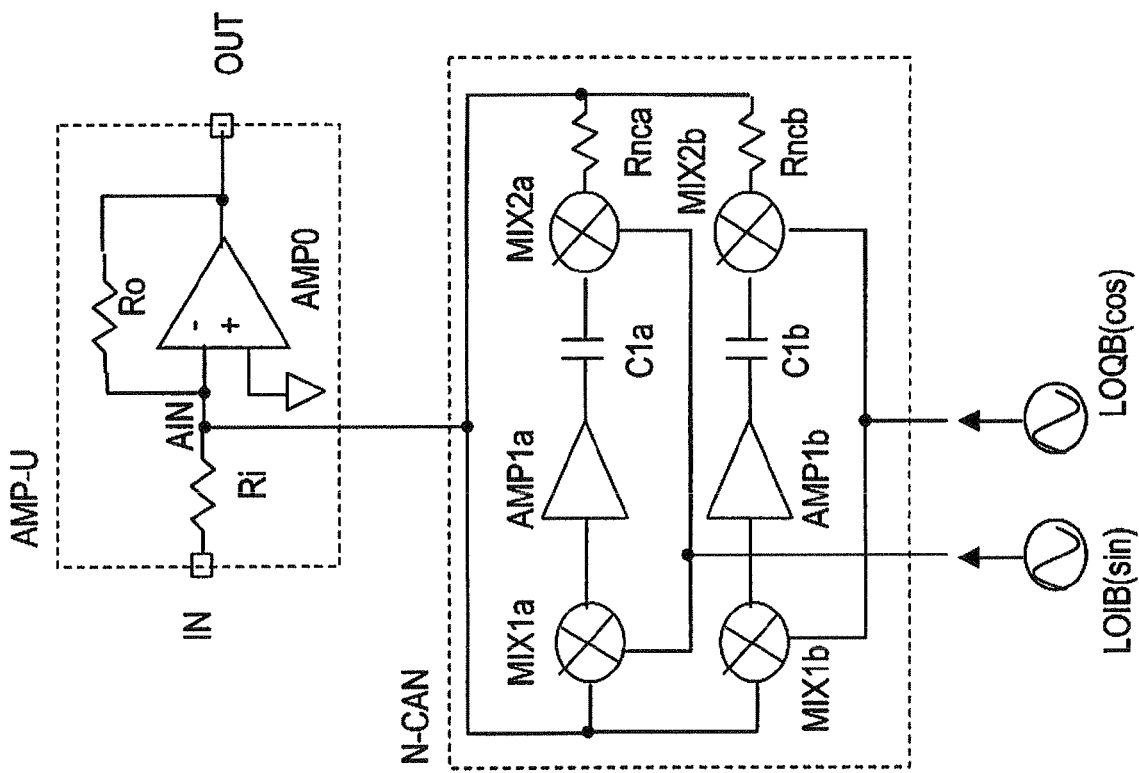
FIG. 6 shows the configuration of the amplifier and noise cancellation circuit of a third embodiment.

FIG. 6 shows the configuration of the amplifier and noise cancellation circuit of a third embodiment. This noise cancellation circuit N-CAN has two sets of the noise cancellation circuit of FIG. 4 in parallel. That is, the noise cancellation circuit N-CAN has first mixers MIX1$a$, $b$, amplifiers AMP1$a$, $b$, second mixers MIX2$a$, $b$, and capacitors C1$a$, $b$. The mixers MIX1$a$, MIX2$a$ of the first set perform frequency conversion according to a first local frequency signal LOIB, and the mixers MIX1$b$, MIX2$b$ of the second set perform frequency conversion according to a second local frequency signal LOQB. The first and second local frequency signals LOIB and LOQB have a phase difference of $\pi/2$; the first local frequency signal LOIB is a sine wave (sin), and the second local frequency signal LOQB is a cosine wave (cos).

These two sets can eliminate 2LOB image frequency signals input to the input terminal AIN of the amplifier AMP-U.

That is, frequency conversion is performed twice according to local frequency signals having a phase difference by $\pi/2$, so that the low-frequency components, that is, the DC components, of the noise cancellation signals output to the two output resistances Rnca, Rncb are cancelled.

Figure 7:
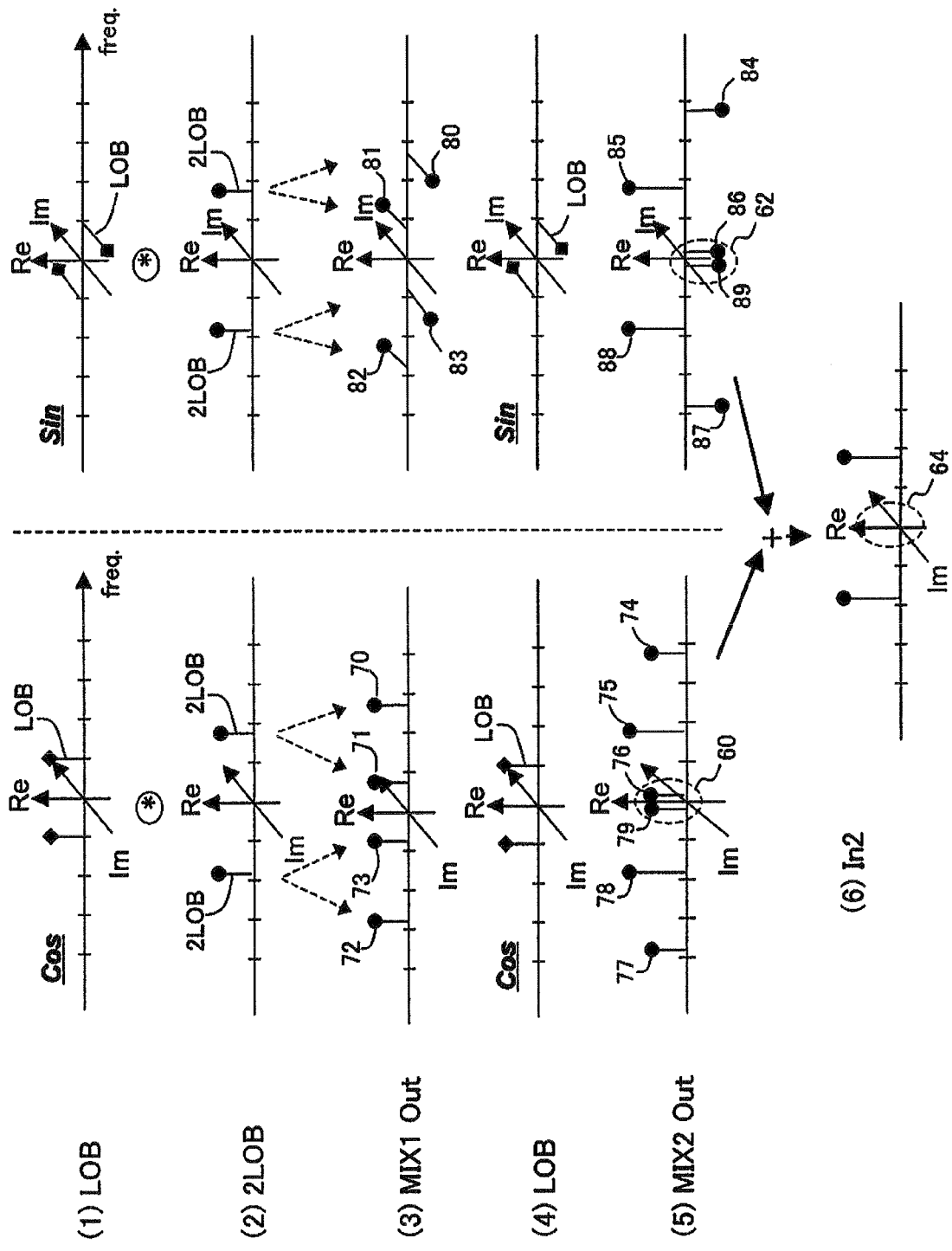
FIG. 7 shows an operation of the noise cancellation circuit in the third embodiment.

FIG. 7 explains operation of the noise cancellation circuit in the third embodiment. In FIG. 7, (1) is the local frequency signal LOB, (2) is the image frequency signal 2LOB input to AMP-U, (3) is the output MIX1out of the first mixers MIX1a, b, (4) is the local frequency signal LOB, and (5) is the output MIX2out of the second mixers MIX2a, b. The left-hand side shows signals for the first set, and the right shows signals for the second set. In each case the horizontal axis indicates the frequency freq., and the vertical axis corresponds to the signal strength. The vertical axis has a real axis Re and an imaginary axis Im. One graduation of the horizontal axis is the frequency LOB. Also, the imaginary axis Im is in a diagonal direction. To simplify the explanation, in (2), the image frequency signal 2LOB, only the component in the direction of the real axis Re is shown.

To explain the left-hand side of FIG. 7, the first local frequency signal LOB has a component in the direction of the real axis Re. And, the image frequency signal 2LOB also has a component in the direction of the real axis Re. The image frequency signal 2LOB has a frequency component near 2LOB.

On the side of the first set, the first mixer MIX1a performs frequency conversion of the image frequency signal 2LOB according to the first local frequency LOB (LOIB), and converts the two image frequency signals 2LOB of (2) to the frequency bands near the frequency components LOB and 3LOB. That is, frequency conversion indicated by the dashed lines is performed. This is indicated by the signals 70, 71, 72, 73 in the output MIX1out of the first mixer MIX1 in (3). And, the second mixer MIX2a performs frequency conversion of this output MIX1out according to the first local frequency LOB (LOIB), to convert the four frequency components 70 to 73 of (3) into the frequency components 74, 75, 76 and 77, 78, 79, near the frequency components 0, 2LOB, and 4LOB respectively. This is indicated as MIX2out in (5). The frequency components 75, 78 near frequency 2LOB are the result of superpositioning of two signals, with higher signal strength.

The second mixer output MIX2out has noise 76, 79 converted from the image frequency signal 2LOB in the low-frequency band DC component 60. This is superposed on the noise cancellation signal and impedes appropriate noise cancellation.

On the side of the second set, the first mixer MIX1b performs frequency conversion of the image frequency signal 2LOB according to the second local frequency LOB (LOQB), and converts the two image frequency signals 2LOB of (2) to frequency bands near the frequency components LOB and 3LOB. This is indicated by the signals 80, 81, 82, 83 in the output MIX1out of the first mixer MIX1 in (3). As shown, the second local frequency signal LOB is an imaginary component, so that the components 80 to 83 of the output MIX1out of the first mixer MIX1b are also imaginary components. And, the second mixer MIX2b performs frequency conversion of this output MIX1out according to the second local frequency LOB (LOQB), to convert the four frequency components 80 to 83 of (3) into the frequency components 84, 85, 86 and 87, 88, 89, near the frequency components 0, 2LOB, and 4LOB respectively. The frequency components 85, 88 near frequency 2LOB are the result of superpositioning of two signals, with higher signal strength. Both (3) and (4) are imaginary components, and so after conversion are real components. This is indicated by MIX2out in (5).

On the side of the second set also, the second mixer output MIX2out has noise 86, 89 converted from the image frequency signal 2LOB in the low-frequency band DC component 62.

And, when the second mixer outputs MIX2out of the first and second sets shown on the left and right in FIG. 7 are combined, the signals 76, 79 and 86, 89 in the low-frequency band 60, 62 respectively cancel, and the combined signal In2 in (6) does not have signals in the low-frequency band 64.

In FIG. 7, when the image frequency signals 2LOB of (2) have an imaginary component, similarly to the above description, the second mixer outputs MIX2out of the first and second sets each have a reverse-phase low-frequency component in the direction of the imaginary axis Im, and upon combining these the low-frequency DC components are cancelled.

As explained above, the noise cancellation circuit N-CAN has circuits in two sets, which perform frequency conversion according to local frequency signals LOIB and LOQB which are shifted in phase by $\pi/2$, so that the image frequency signals are eliminated from the combined signal. That is, image rejection occurs.

In FIG. 6, it is desirable that low-pass filters be provided on the input sides of the first mixers MIX1a and MIX1b. That is, as explained using FIG. 5, a low-pass filter eliminates image frequency signals in high frequency bands, so that through the low-pass filters and the image rejection function of the circuits of the two sets, image frequency signals can be completely eliminated.

Figure 8:
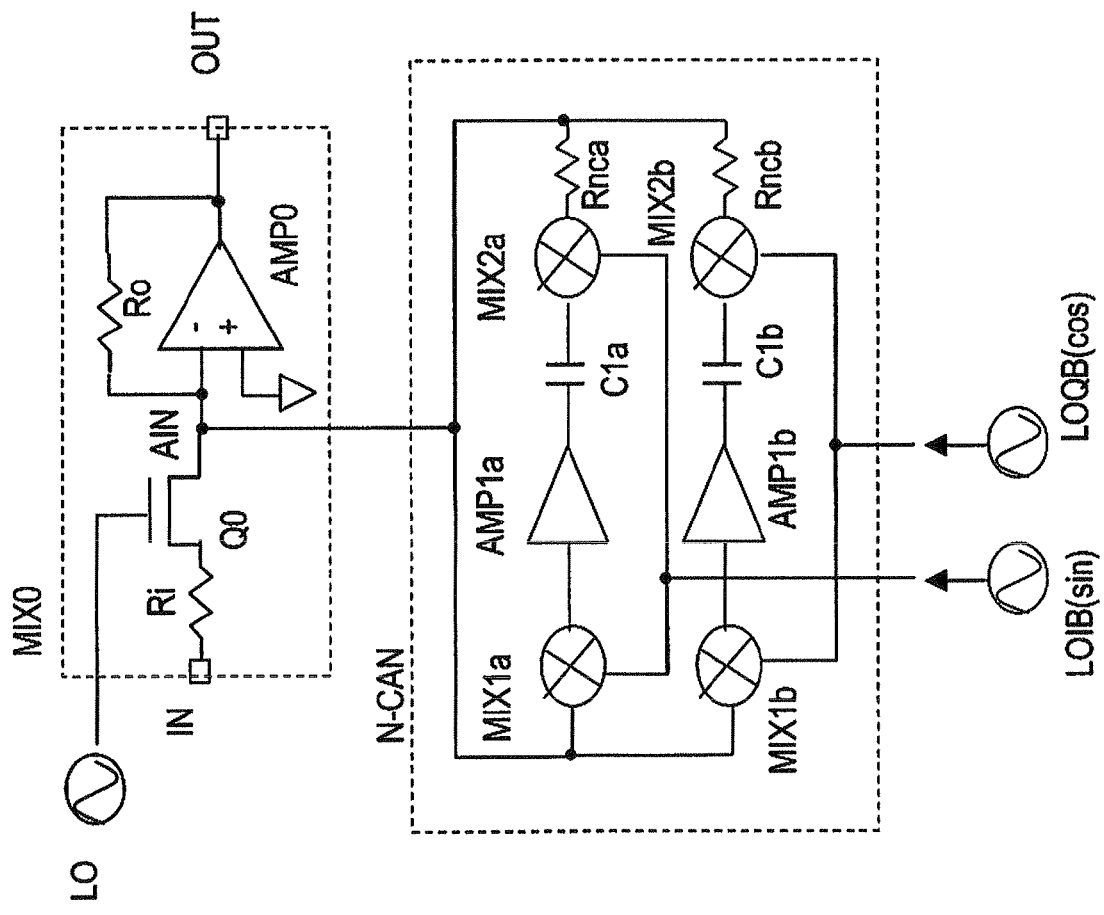
FIG. 8 shows the configuration of the mixer and noise cancellation circuit of a fourth embodiment.

FIG. 8 shows the configuration of the mixer and noise cancellation circuit of a fourth embodiment. In this embodiment, in place of the amplifier AMP-U of FIG. 6, a mixer MIX0 is provided. And, the noise cancellation circuit N-CAN is the same circuit N-CAN as in FIG. 6. The mixer MIX0 has, between the input resistance Ri and the operational amplifier AMP0, a MOS transistor Q0 which repeatedly conducts and does not conduct according to the mixer local frequency signal LO. The operational amplifier AMP0 is provided with a feedback resistance (output resistance) Ro. The circuit of FIG. 8 is an example of a circuit applied to a single-phase signal.

Operation by the noise cancellation circuit N-CAN to supply a noise cancellation signal to the input terminal AIN of the mixer operational amplifier AMP0 is the same as for the circuit in FIG. 6. That is, the mixer MIX0, having an operational amplifier AMP0 and MOS transistor Q0, has 1/f noise at the input terminal AIN. The noise cancellation circuit N-CAN amplifies the signal component due to this 1/f noise using the amplifiers AMP1a and AMP1b, and supplies the result to the input terminal AIN via the output resistances Rnca, Rncb. As a result, the current flowing in the feedback resistance Ro of the mixer MIX0 is suppressed or eliminated, and the 1/f noise at the output terminal OUT is suppressed or eliminated.

Similarly to FIG. 6, the noise cancellation circuit N-CAN has first and second sets of circuits in parallel, which are respectively provided with local frequency signals LOIB and LOQB with a phase difference of $\pi/2$, and image frequency components input to the input terminal AIN are eliminated. The local frequency signal LO of the mixer MIX0 and the local frequency signal LOB of the noise cancellation circuit N-CAN are different signals, and need not have the same frequency, but may have the same frequency.

Figure 9:
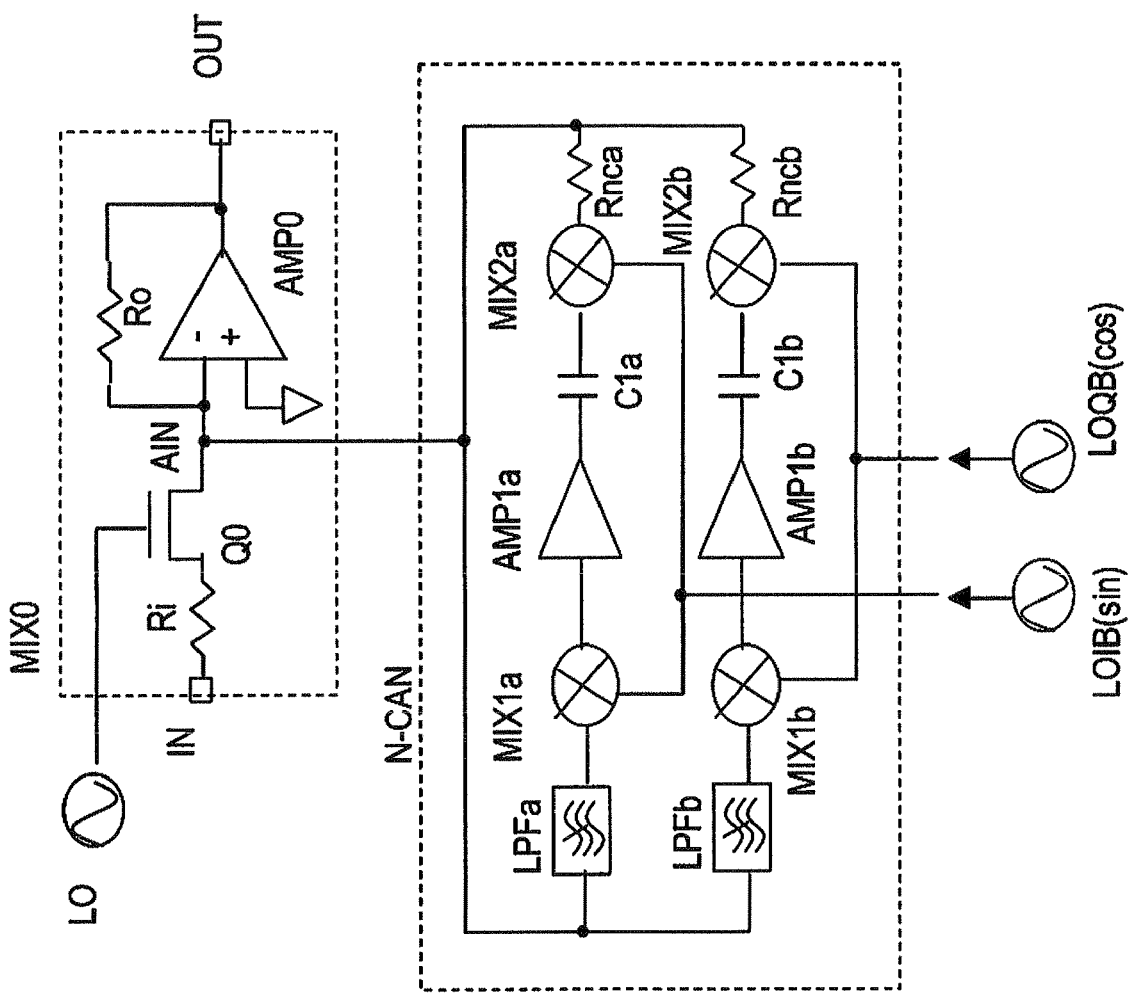
FIG. 9 shows the configuration of the mixers and noise cancellation circuit of a fifth embodiment.

FIG. 9 shows the configuration of the mixers and noise cancellation circuit of a fifth embodiment. In the fifth embodiment, the noise cancellation circuit N-CAN has low-pass filters LPFa, LPFb on the input sides of the mixers MIX1a, MIX1b. Otherwise the configurations of the mixers and noise cancellation circuit are the same as in the fourth embodiment of FIG. 8. By providing the low-pass filters LPFa and LPFb, similarly to FIG. 5, image frequency components in the high-frequency band can be removed, and image frequency components can be eliminated more completely.

In the fourth and fifth embodiments of FIG. 8 and FIG. 9, the noise cancellation circuit of FIG. 4 and FIG. 5 may be provided.

Figure 10:
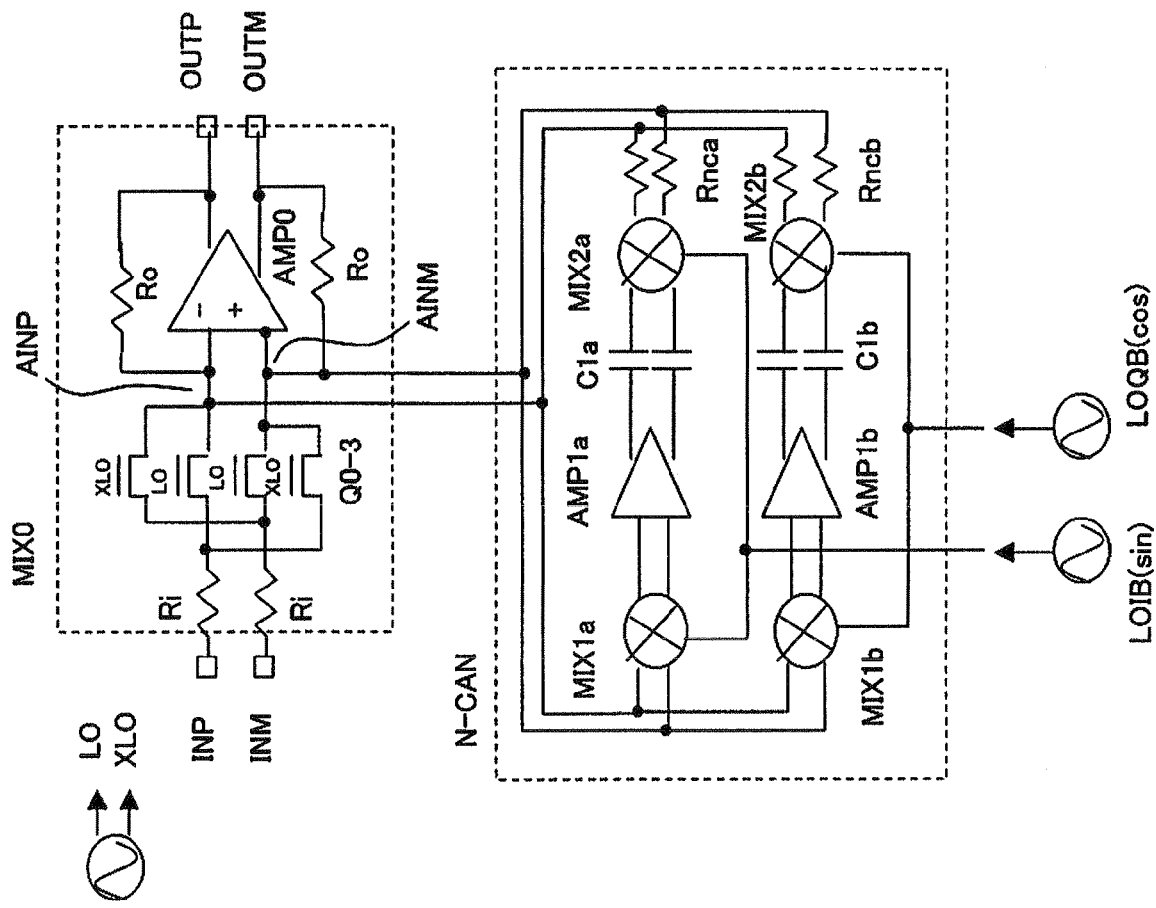
FIG. 10 shows the configuration of the mixers and noise cancellation circuit of a sixth embodiment.

FIG. 10 shows the configuration of the mixers and noise cancellation circuit of a sixth embodiment. Whereas the fourth embodiment was a circuit to which a single-phase signal was applied, the sixth embodiment is a circuit to which a differential signal is applied. The operation is the same as in the fourth embodiment.

The mixer MIX0 takes inverse-phase signals as inputs to the input pair INP and INM, and supplies the signals to the input terminal pair of the operational amplifier AMP0 via a MOS transistor pair which are controlled to conduct and not conduct by the mixer local frequency signal LO (in the figure, the LO MOS transistor pair), and via a MOS transistor pair which is controlled to conduct and not conduct by the local frequency signal XLO with reverse phase (phase difference π) (in the figure, the XLO MOS transistor pair). For example, if the local frequency signal LO is at H level, then the differential signal at the input terminal pair INP, INM is supplied without change to the input pair of the operational amplifier AMP0, and if the local frequency signal LO is at L level, the differential signal at the input terminal pair INP, INM is inverted and supplied to the input pair of the operational amplifier AMP0.

The noise cancellation circuit N-CAN has two sets of circuits in parallel, similarly to FIG. 8, and configured to accommodate differential signals. However, as with the noise cancellation circuit of FIG. 4, a configuration comprising one set of mixers MIX1, MIX2 and an amplifier AMP1 alone is also possible.

Figure 11:
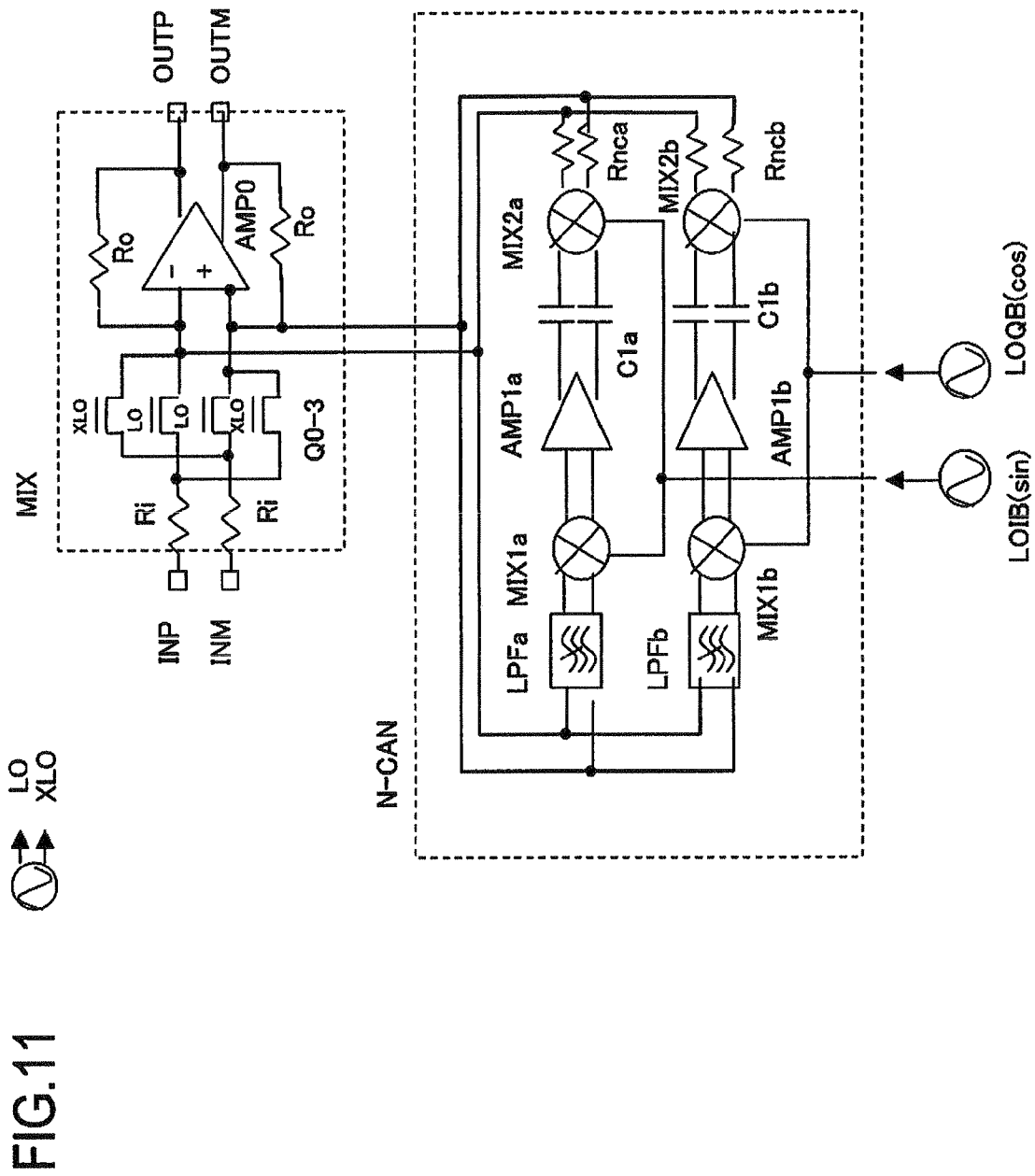
FIG. 11 shows the configuration of mixers and noise cancellation circuit of a seventh embodiment.

FIG. 11 shows the configuration of mixers and noise cancellation circuit of a seventh embodiment. In the seventh embodiment, the noise cancellation circuit N-CAN has low-pass filters LPFa and LPFb on the input sides of the mixers MIX1a and MIX1b. Otherwise the configuration of the mixers and noise cancellation circuit is the same as in the sixth embodiment of FIG. 10. By providing the low-pass filters LPFa and LPFb, similarly to FIG. 5, image frequency components in the high frequency band can be removed, and image frequency components can be eliminated more completely.

Figure 12:
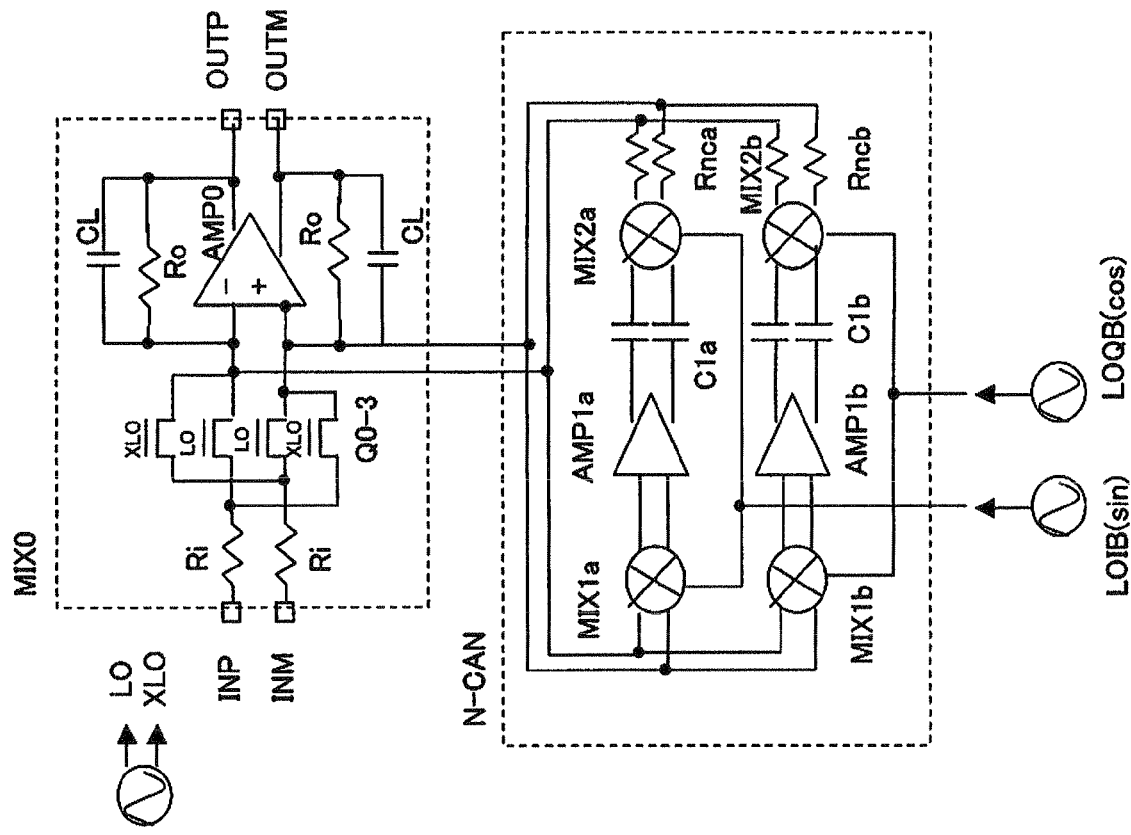
FIG. 12 shows the configuration of the mixers and noise cancellation circuit of an eighth embodiment.

FIG. 12 shows the configuration of the mixers and noise cancellation circuit of an eighth embodiment. In the eighth embodiment, a capacitor CL for filtering is provided in parallel with the feedback resistance Ro of the mixer MIX0. That is, a low-pass filter CL is provided as a primary filter within the mixer MIX. Otherwise the configuration is the same as in the sixth embodiment of FIG. 10. In the eighth embodiment, the noise cancellation circuit N-CAN may be provided with low-pass filters on the input sides of the mixers MIX1a and MIX1b, as in the seventh embodiment of FIG. 11.

The mixer circuit comprising transistors Q0-3 in FIG. 12 is used as first and second mixers MIX1a, 1b and MIX2a, 2b within the noise cancellation circuit N-CAN. In this case, there is no operational amplifier within the mixer circuits, and 1/f noise is not generated, as explained using FIG. 4.

As explained above, by means of these embodiments, 1/f noise is detected at the input terminal AIN of an amplifier comprising MOS transistors or of an operational amplifier of a mixer comprising an amplifier, and by supplying a noise cancellation signal, 1/f noise at the output terminal of the amplifier or mixer can be reduced or eliminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A noise cancellation circuit, which reduces noise in an output signal of an amplifier having an input resistance, a feedback resistance, and an operational amplifier, comprising:
    a first mixer circuit, which input an input signal across a first input terminal and a second input terminal of the operational amplifier, and performs frequency conversion of the input signal according to a first frequency signal;
    a noise cancellation amplifier, which amplifies an output signal of the first mixer circuit;
    a second mixer circuit, which performs frequency conversion of an output signal of the noise cancellation amplifier according to the first frequency signal; and
    a signal supply circuit, which supplies an output signal of the second mixer circuit to the first input terminal of the operational amplifier via an output resistance.

2. The noise cancellation circuit according to claim 1, wherein a gain by the first mixer circuit, the noise cancellation amplifier and the second mixer circuit is set such that a current flowing in the input resistance of the amplifier is equal to or substantially equal to a current flowing in an output resistance of the signal supply circuit.

3. The noise cancellation circuit according to claim 1, wherein the first mixer circuit input the input signal of the operational amplifier via a low-pass filter.

4. The noise cancellation circuit according to claim 1, wherein the output signal of the noise cancellation amplifier is input to the second mixer circuit via a high-pass filter.

5. The noise cancellation circuit according to claim 1, wherein
    two sets of the first mixer circuit, the amplifier for noise cancellation, the second mixer circuit, the output resistance, and the signal supply circuit are provided in parallel,
    the first and second mixer circuits of a first set perform frequency conversion according to the first frequency signal,
    the first and second mixer circuits of a second set perform frequency conversion according to a second frequency signal having the same frequency as the first frequency signal and having a phase orthogonal thereto, and
    the output signals of the first and second sets are both supplied to the first input terminal of the operational amplifier.

6. The noise cancellation circuit according to claim 1, wherein
    the input resistance has a first input resistance and a second input resistance,
    the feedback resistance has a first feedback resistance and a second feedback resistance, the operational amplifier input a differential input signal of the first input terminal and the second input terminal and outputs a differential output signal across a first output terminal and a second output terminal, and the first mixer circuit, the noise cancellation amplifier, the second mixer circuit, and the signal supply circuit input a differential signal and output a differential signal.

7. An amplifier with a noise cancellation circuit, comprising:

an amplifier, having an input resistance, a feedback resistance, and a first operational amplifier;

a first mixer circuit, which input an input signal across a first input terminal and a second input terminal of the first operational amplifier, and performs frequency conversion of the input signal according to a first frequency signal;

a second operational amplifier, which amplifies an output signal of the first mixer circuit;

a second mixer circuit, which performs frequency conversion of the output signal of the second operational amplifier according to the first frequency signal; and a signal supply circuit, which supplies an output signal of the second mixer circuit to the first input terminal of the first operational amplifier via an output resistance.

8. The amplifier according to claim 7, wherein a gain by the first mixer circuit, the second operational amplifier and the second mixer circuit is set such that a noise current flowing in the input resistance of the amplifier is equal to or substantially equal to a current flowing in an output resistance of the signal supply circuit.

9. The amplifier according to claim 7, wherein two sets of the first mixer circuit, the second operational amplifier, the second mixer circuit, the output resistance, and the signal supply circuit are provided in parallel, the first and second mixer circuits of a first set perform frequency conversion according to the first frequency signal, the first and second mixer circuits of a second set perform frequency conversion according to a second frequency signal having the same frequency as the first frequency signal and having a phase orthogonal thereto, and the currents flowing in the output resistances of the first and second sets are both supplied to the first input terminal of the first operational amplifier.

10. The amplifier according to claim 7, wherein the input resistance has a first input resistance and a second input resistance, the feedback resistance has a first feedback resistance and a second feedback resistance, the first operational amplifier takes as input a differential input signal of the first input terminal and the second input terminal and outputs a differential output signal, and the first mixer circuit, the second operational amplifier, the second mixer circuit, and the second signal supply circuit take as inputs a differential signal and output a differential signal.

11. A mixer unit, comprising:

the amplifier according to claim 7; and a third mixer circuit, provided between the input resistance and the first or second input terminal of the first operational amplifier, and having a MOS transistor which is conducting and non-conducting according to a mixer local frequency signal.

12. The mixer unit according to claim 11, further comprising a capacitor in parallel with the feedback resistance of the amplifier.

13. A mixer unit, comprising:

the amplifier according to claim 10; and a third mixer circuit, provided between the first and second input resistances, and the first and second input terminals of the first operational amplifier, wherein the third mixer circuit has first and second MOS transistors, provided between the first input resistance and the first input terminal and between the second input resistance and the second input terminal respectively, and which are conducting and non-conducting according to the first frequency signal, and third and fourth MOS transistors, provided between the first input resistance and the second input terminal and between the second input resistance and the first input terminal respectively, and which are conducting and non-conducting according to a reverse-phase mixer local frequency signal having a phase opposite the mixer local frequency signal.

14. The mixer unit according to claim 13, further comprising a capacitor in parallel with the feedback resistance of the amplifier.

\* \* \* \* \*